US011422600B2

(12) United States Patent
Sultenfuss et al.

(10) Patent No.: US 11,422,600 B2
(45) Date of Patent: Aug. 23, 2022

(54) ADAPTIVE MULTIMODE USB-C POWER TRANSMISSION AND CONVERSION

(71) Applicant: Dell Products, L.P., Round Rock, TX (US)

(72) Inventors: Andrew Thomas Sultenfuss, Leander, TX (US); Richard C. Thompson, Cedar Park, TX (US)

(73) Assignee: Dell Products, L.P., Round Rock, TX (US)

( * ) Notice: Subject to any disclaimer, the term of this patent is extended or adjusted under 35 U.S.C. 154(b) by 264 days.

(21) Appl. No.: 16/751,912

(22) Filed: Jan. 24, 2020

(65) Prior Publication Data

US 2021/0232196 A1 Jul. 29, 2021

(51) Int. Cl.
*G06F 1/28* (2006.01)
*G06F 1/26* (2006.01)
*H02J 7/00* (2006.01)
*H02J 7/02* (2016.01)

(52) U.S. Cl.
CPC ................ *G06F 1/28* (2013.01); *G06F 1/266* (2013.01); *H02J 7/0063* (2013.01); *H02J 7/02* (2013.01)

(58) Field of Classification Search
CPC .......... G06F 1/28; G06F 1/266; H01J 7/0063; H02J 7/02
See application file for complete search history.

(56) References Cited

U.S. PATENT DOCUMENTS

| 2017/0140887 | A1* | 5/2017 | Waters | H01R 24/60 |
| 2017/0293335 | A1* | 10/2017 | Dunstan | H02J 7/00 |
| 2018/0356873 | A1* | 12/2018 | Regupathy | G06F 1/266 |
| 2018/0375341 | A1* | 12/2018 | Sultenfuss | H02M 3/28 |
| 2020/0119573 | A1* | 4/2020 | Dalena | H02M 3/158 |

* cited by examiner

*Primary Examiner* — Jaweed A Abbaszadeh
*Assistant Examiner* — Gayathri Sampath
(74) *Attorney, Agent, or Firm* — Fogarty LLP (57) ABSTRACT

Systems and methods are provided for adaptively powering an Information Handling System (IHS) using a multimode AC adapter. Information reported by the multimode adapter is utilized to determine whether it supports USB-PD power transmissions and also supports high-power transmissions. The power demand of the IHS is monitored. When the power demand is greater than the USB-PD power levels, the multimode adapter is configured for providing a high-power transmission and a power circuit of the IHS is configured for converting the high-power transmission to a voltage used by the IHS. When the power demand is not greater than the USB-PD power levels, the multimode adapter is configured for providing a USB-PD transmission. Some embodiments may detect events associated with high power demand and may preemptively configure the power circuit of the IHS for providing high-power outputs upon detecting such events.

20 Claims, 5 Drawing Sheets

ADAPTIVE MULTIMODE USB-C POWER TRANSMISSION AND CONVERSION

FIELD

This disclosure relates generally to Information Handling Systems (IHSs), and more specifically, to powering portable IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Certain IHSs, such as laptops, tablets and mobile phones, are portable and are designed to operate using power supplied by rechargeable batteries. Power drawn from an electrical outlet may be used to charge the batteries of a portable IHS. Since the batteries of IHSs operate using DC (Direct Current) power, an AC adapter (i.e., AC/DC adapter or AC/DC converter) is required to convert the AC power from the wall outlet to DC power that can be used to charge the batteries. In some instances, AC adapters may provide DC power to an IHS via a cylindrical, barrel connector that couples with a corresponding DC power port receptable of the IHS. In some instances, DC power may be additionally or alternatively provided via a USB (Universal Serial Bus) coupling. The USB Power Delivery (USB-PD) Specification specifies communications between an AC adapter and an IHS that enable negotiation of various supply voltages that are supported by the AC adapter and that may be provided to the IHS via a USB port. The IHS utilizes the provided power in charging one or more rechargeable batteries of a battery system and in powering the operations of the IHS.

SUMMARY

In various embodiments, methods are provided for powering an Information Handling System (IHS) using a multimode AC adapter. The methods include: determining, based on information reported by the multimode AC adapter, the multimode AC adapter supports USB-PD power transmissions and further supports high-power transmissions; monitoring a power demand of the IHS; when the power demand is greater than the power levels of the supported USB-PD power transmissions, configure the multimode AC adapter for providing a high-power transmission, and further configure a power circuit of the IHS for converting the high-power transmission to a voltage used to power operations of the IHS; and when the power demand is not greater than the power levels power levels of the supported USB-PD power transmissions, configure the multimode AC adapter for providing a USB-PD transmission.

In additional method embodiments, the high-power transmission comprises a nominal voltage of approximately 54 volts and a peak voltage not exceeding 60 volts. In additional method embodiments, the operation of the power circuit generates greater than 200 watts of power in converting the high-power transmission to the voltage used to power operations of the IHS. In additional method embodiments, the power circuit comprises a plurality of digital voltage dividers operable for converting the high-power transmission to the voltage used to power operations of the IHS. In additional method embodiments, the power demand monitoring comprises detecting a power demand event by the IHS. In additional embodiments, methods further include delaying the configuration of the power circuit until additional indications are identified of the power demand in excess of the USB-PD power transmissions. In additional method embodiments, the power demand event comprises a request for the IHS to provide power to an external device coupled to the IHS. In additional method embodiments, the power demand event comprises a state change of an integrated component of the IHS. In additional method embodiments, the power demand event comprises an initialization of a software application.

In various additional embodiments, systems are provided for powering an Information Handling System (IHS). The systems include a multimode AC (Alternating Current) adapter configured to support power transmissions comprising USB-PD (Universal Serial Bus Power Delivery) transmissions and further comprising high-power transmissions of a voltage greater than voltages of the of USB-PD transmissions. The systems further include an IHS configured to: monitor a power demand of the IHS; when the power demand is greater than the power levels of the supported USB-PD power transmissions, configure the multimode AC adapter for providing a high-power transmission, and further configure a power circuit of the IHS for converting the high-power transmission to a voltage used to power operations of the IHS; and when the power demand is not greater than the power levels power levels of the supported USB-PD power transmissions, configure the multimode AC adapter for providing a USB-PD transmission.

In additional system embodiments, the high-power transmission comprises a nominal voltage of approximately 54 volts and a peak voltage not exceeding 60 volts. In additional system embodiments, the operation of the power circuit generates greater than 200 watts of power in converting the high-power transmission to the voltage used to power operations of the IHS. In additional system embodiments, the power demand monitoring comprises detecting a power demand event by the IHS. In additional method embodiments, the IHS is further configured to: delay the configuration of the power circuit until additional indications are identified of the power demand in excess of the USB-PD power transmissions. In additional system embodiments, the power circuit comprises a plurality of digital voltage dividers operable for converting the high-power transmission to the voltage used to power operations of the IHS.

In various additional embodiments, Information Handling Systems (IHSs) are provided power using a multimode AC adapter. The IHSs include: one or more processors; a memory device coupled to the one or more processors, the memory device storing computer-readable instructions that, upon execution by the one or more processors, cause execution of an operating system of the IHS; and an embedded controller comprising a memory having program instructions stored thereon that, upon execution by a logic unit of the embedded controller, cause the embedded controller to: determine the multimode AC adapter supports USB-PD charging transmission and further supports high-power transmissions of a voltage greater than voltages of the supported USB-PD transmissions; monitor a power demand of the IHS; when the power demand is greater than the power levels of the supported USB-PD power transmissions, configure the multimode AC adapter for providing a high-power transmission, and further configure a power circuit of the IHS for converting the high-power transmission to a voltage used to power operations of the IHS; and when the power demand is not greater than the power levels power levels of the supported USB-PD power transmissions, configure the multimode AC adapter for providing a USB-PD transmission.

In additional IHS embodiments, the high-power charging transmission comprises a nominal voltage of approximately 54 volts and a peak voltage not exceeding 60 volts. In additional IHS embodiments, the power circuit comprises a plurality of digital voltage dividers operable for converting the high-power transmission to the voltage used to power operations of the IHS. In additional IHS embodiments, the power demand monitoring comprises detecting a power demand event by the IHS. In additional IHS embodiments, execution of the program instructions further causes the embedded controller to: delay the configuration of the power circuit until additional indications are identified of the power demand in excess of the USB-PD power transmissions.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
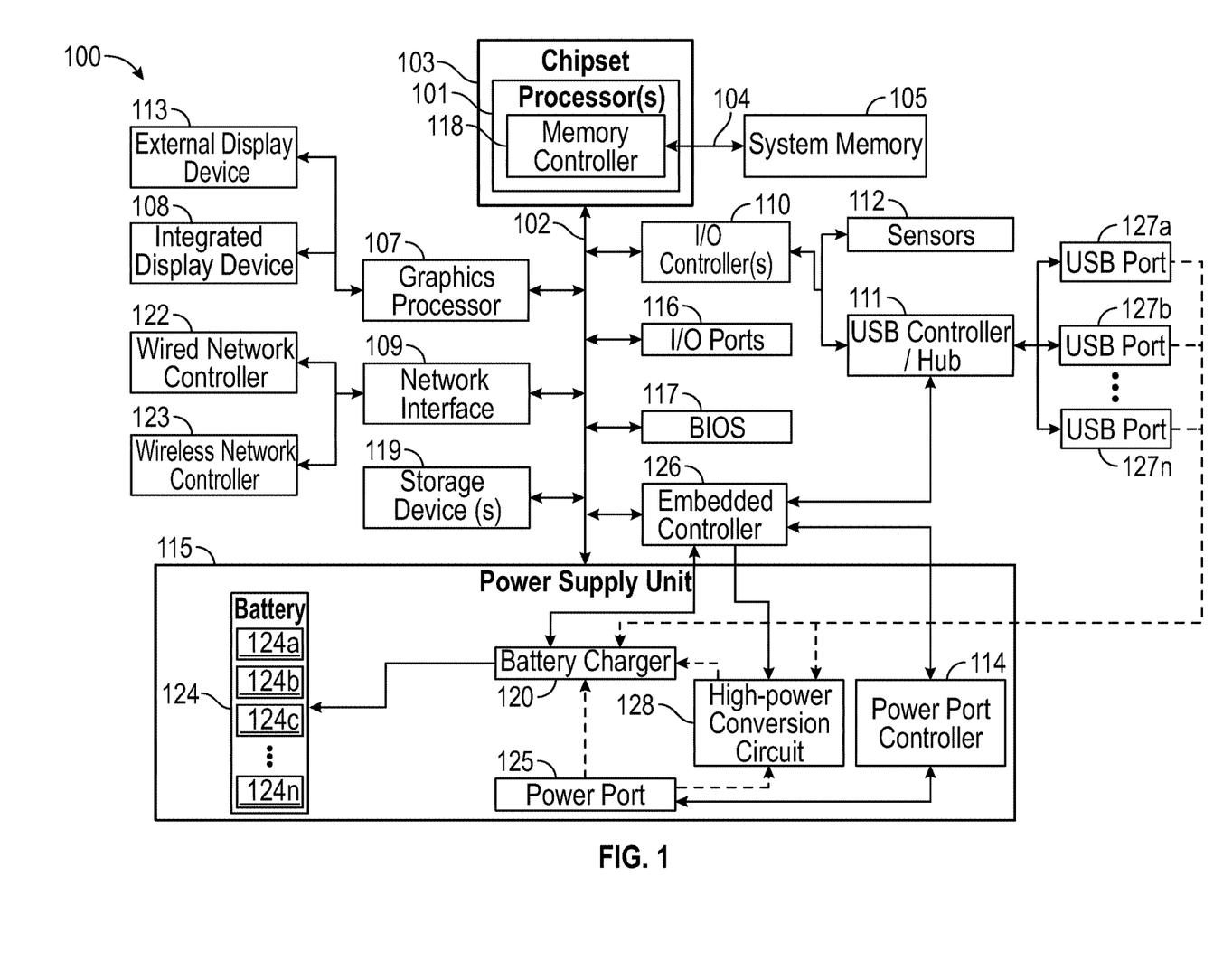
FIG. 1 is a block diagram depicting certain components of an IHS operable according to various embodiments for adaptive multimode USB-C power transmission and conversion.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device, other embodiments may be utilized.

As described, certain portable IHSs may utilize AC adapters for providing power from an electrical outlet that is converted to a DC output that is used in powering a portable IHS and/or recharging internal batteries of a portable IHS. As IHSs become thinner, and thus more portable, it is preferable that the AC adapters used for charging portable IHSs also remain as thin and as portable as possible. The adoption of thinner charging connectors promotes thin portable IHSs and thin AC adapters. For instance, USB-C connectors may support providing an IHS with charging inputs and may be considerably thinner than USB Type A connectors, as well as being thinner than the cylindrical barrel connectors that are commonly supported by IHS power ports.

While IHSs become increasingly thinner and more portable, the power requirements for portable IHSs are not necessarily decreasing. As described with regard to FIG. 1, certain portable IHSs such as laptops may include multi-core processors, a separate graphics processor, significant amounts of memory, persistent storage drives, specialized microcontrollers and one or more integrated displays. Such high performance portable IHSs may have significant power demands, in some cases greater than 200 watts. In some instances, portable IHSs may have power demands as high as 250 watts. In many instances, portable IHSs may also be expected to serve as a source of power for external devices coupled to the portable IHS. USB-C power adapters utilize thin cabling that limits power transmissions to 5 amps. Since charging voltages specified by USB-PD protocols are limited to 20 volts, existing USB-C power adapters are limited to providing less than 100 watts of power. Power demands by IHSs are not always static, or even consistent. Instead, as described in additional detail with regard to FIG. 4, the power demands of an IHS may exhibit pronounced, but temporary, periods of peak power demand and periods of more limited, routine power demand.

In order to be classified as NEC (National Electrical Code) Class 2 or Class 3 power supply units, the output of a power supply must be less than 60 volts. Power supplies with voltage outputs greater than 60 volts may be considered to pose a risk of fire or electric shock and may thus be subject to additional circuit protection requirements.

Accordingly, embodiments provide support for AC power adapters capable of transmitting output voltages up to 60 volts that may be used to provide upwards of 200 watts of power to IHSs. As described in additional detail below, embodiments may support transmission of supply voltages up to 60 volts via USB-C couplings and may convert the transmitted supply voltage to high-power charging outputs greater than 200 watts through the use of a high-efficiency, high-power conversion circuit of the IHS. Power adapters according to embodiments that support transmission of supply voltages up to 60 volts may be USB-C power adapters that utilize the various pins supported by USB-C connectors to support use of data lines and power supply lines between an IHS and a coupled device. Using these USB-C couplings, the power supply lines may support bi-directional charge transfer where the IHS may either be supplied with power or may serve as a source of power. Using the high-power conversion circuit of IHS embodiments, USB-C power adapter may support transmission of voltages up to 60 volts, as well as transmission of supply voltages supported by the USB-PD specifications (e.g., 5V, 9V, 15V, 20V), thus providing multimode charging outputs.

FIG. 1 is a block diagram depicting certain components of an IHS 100 operable according to various embodiments for adaptive multimode USB-C power transmission and conversion. As described in additional detail below, a multimode power adapter may provide IHS 100 with high-power charging inputs via a USB-C coupling, such as charging inputs exceeding 200 watts, while also supporting charging of IHS 100 via USB-PD inputs. In various embodiments, IHS 100 may include an embedded controller 126 that includes logic that executes program instructions, in conjunction with operations by components of power supply unit 115 and USB controller 111, to perform the operations disclosed herein for configuring adaptive multimode USB-C power transmission and conversion. While a single IHS 100 is illustrated in FIG. 1, IHS 100 may be a component of an enterprise system that may include any number of additional IHSs that may also be configured in the same or similar manner to IHS 100.

IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104.

The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of buses to provide the illustrated pathways served by bus 102.

As illustrated, a variety of resources may be coupled to the processor(s) 101 of the IHS 100 through the chipset 103. For instance, chipset 103 may be coupled to a network interface 109 that may support different types of network connectivity. In certain embodiments, IHS 100 may include one or more Network Interface Controllers (NICs), each of which may implement the hardware required for communicating via a specific networking technology, such as BLUETOOTH, Ethernet and mobile cellular networks (e.g., CDMA, TDMA, LTE). As illustrated, network interface 109 may support network connections by wired network controllers 122 and wireless network controller 123. Each network controller 122, 123 may be coupled via various buses to the chipset 103 of IHS 100 in supporting different types of network connectivity, such as the network connectivity utilized by applications of the operating system of IHS 100.

Chipset 103 may also provide access to one or more display device(s) 108, 113 via graphics processor 107. In certain embodiments, graphics processor 107 may be comprised within a video or graphics card or within an embedded controller installed within IHS 100. In certain embodiments, graphics processor 107 may be integrated within processor 101, such as a component of a system-on-chip. Graphics processor 107 may generate display information and provide the generated information to one or more display device(s) 108, 113 coupled to the IHS 100. The one or more display devices 108, 113 coupled to IHS 100 may utilize LCD, LED, OLED, or other display technologies. Each display device 108, 113 may be capable of receiving touch inputs such as via a touch controller that may be an embedded component of the display device 108, 113 or graphics processor 107, or may be a separate component of IHS 100 accessed via bus 102. As illustrated, IHS 100 may support an integrated display device 108, such as a display integrated into a laptop, tablet, 2-in-1 convertible device, or mobile device. In some embodiments, IHS 100 may be a hybrid laptop computer that includes dual integrated displays incorporated in both of the laptop panels. IHS 100 may also support use of one or more external displays 113, such as external monitors that may be coupled to IHS 100 via various types of couplings.

In certain embodiments, chipset 103 may utilize one or more I/O controllers 110 that may each support hardware components such as user I/O devices 111 and sensors 112. For instance, I/O controller 110 may provide access to one or more user I/O devices 110 such as a keyboard, mouse, touchpad, touchscreen, microphone, speakers, camera and other input and output devices that may be coupled to IHS 100. Each of the supported user I/O devices 111 may interface with the I/O controller 110 through wired or wireless connections. In certain embodiments, sensors 112 accessed via I/O controllers 110 may provide access to data describing environmental and operating conditions of IHS 100. For instance, sensors 112 may include geo-location sensors capable for providing a geographic location for IHS 100, such as a GPS sensor or other location sensors configured to determine the location of IHS 100 based on triangulation and network information. Various additional sensors, such as optical, infrared and sonar sensors, that may provide support for xR (virtual, augmented, mixed reality) sessions hosted by the IHS 100.

As illustrated, I/O controllers 110 may include a USB controller 111 that, in some embodiments, may also implement functions of a USB hub. In some embodiments, USB controller 111 may be a dedicated microcontroller that is coupled to the motherboard of IHS 100. In other embodiments, USB controller 111 may be implemented as a function of another component, such as a component of a SoC of IHS 100, embedded controller 126, processors 101 or of an operating system of IHS 100. USB controller 111 supports communications between IHS 100 and one or more USB devices coupled to IHS 100, whether the USB devices may be coupled to IHS 100 via wired or wireless connections. In some embodiments, a USB controller 111 may operate one or more USB drivers that detect the coupling of USB devices and/or power inputs to USB ports 127*a-n*. USB controller 111 may include drivers that implement functions for supporting communications between IHS 100 and coupled USB devices, where the USB drivers may support communications according to various USB protocols (e.g., USB 2.0, USB 3.0). In providing functions of a hub, USB controller 111 may support concurrent couplings by multiple USB devices via one or more USB ports 127*a-n* supported by IHS 100.

In some embodiments, USB controller 111 may control the distribution of both data and power transmitted via USB ports 127*a-n*. For instance, USB controller 111 may support data communications with USB devices that are coupled to the USB ports 127*a-n* according to data communication protocols set forth by USB standards. The power transmissions supported by USB controller 111 may include incoming charging inputs received via USB ports 127*a-n*, as well as outgoing power outputs that are transmitted from IHS 100 to USB devices that are coupled to USB ports 127*a-n*. In some embodiments, USB controller 111 may interoperate with embedded controller 126 in routing power inputs received via USB ports 127*a-n* to a battery charger 120 supported by the power supply unit 115 of IHS 100. USB controller 111 may negotiate the transmission of power inputs received via USB ports 127*a-n*, where these power inputs may include USB-PD power inputs as well as higher-power inputs of up to 60 volts. Using a high-power conversion circuit 126, the power supply unit 115 may convert received supply inputs to up to 60 volts to voltages (e.g., 18-20 volts) suitable for use in rapidly charging the internal batteries 124 of IHS 100 and/or supporting high-power operations of IHS 100. As described in additional detail below, in scenarios where a multimode USB-C adapter according to embodiments is detected as being coupled to one of the USB ports 127*a-n*, USB controller 111 may receive inputs from embedded controller 126 that direct power received at USB ports 127*a-n* to be routed to a high-power conversion circuit 128.

Other components of IHS 100 may include one or more I/O ports 116 that support removeable couplings with various types of peripheral external devices. I/O ports 116 may include various types of ports and couplings that support connections with external devices and systems, either through temporary couplings via ports, such as HDMI ports, accessible to a user via the enclosure of the IHS 100, or through more permanent couplings via expansion slots provided via the motherboard or via an expansion card of IHS 100, such as PCIe slots.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

As illustrated, IHS 100 also includes a BIOS (Basic Input/Output System) 117 that may be stored in a non-volatile memory accessible by chipset 103 via bus 102. In some embodiments, BIOS 117 may be implemented using a dedicated microcontroller coupled to the motherboard of IHS 100. In some embodiments, BIOS 117 may be implemented as operations of embedded controller 126. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

Some IHS 100 embodiments may utilize an embedded controller 126 that may be a motherboard component of IHS 100 and may include one or more logic units. In certain embodiments, embedded controller 126 may operate from a separate power plane from the main processors 101, and thus from the operating system functions of IHS 100. In some embodiments, firmware instructions utilized by embedded controller 126 may be used to operate a secure execution environment that may include operations for providing various core functions of IHS 100, such as power management and management of certain operating modes of IHS 100.

Embedded controller 126 may also implement operations for interfacing with a power supply unit 115 in managing power for IHS 100. In certain instances, the operations of embedded controller may determine the power status of IHS 100, such as whether IHS 100 is operating strictly from battery power, whether any charging inputs are being received by power supply unit 115, and/or the appropriate mode for charging the one or more battery cells 124*a-n* using the available charging inputs. Embedded controller 126 may support routing and use of power inputs received via a USB port 127*a-n* and/or via a power port 125 supported by the power supply unit 115. In addition, operations of embedded controller 126 may provide battery status information, such as the current charge level of the cells 124*a-n* of battery 124.

As described in additional detail below, embedded controller 126 may implement operations for adaptively utilizing a multimode USB-C power supply in supporting improved support for power demands of an IHS that vary over time. In particular, embedded controller 126 may interface with various components of IHS 100 in monitoring the power demands of the IHS. In some embodiments, embedded controller 126 may interface with power supply unit 115 in monitoring the ongoing power demands for charging the battery system 124, for supporting the operations of the IHS 100 and for providing power to external devices coupled to IHS 100, such as via USB ports 127*a-n*. In some embodiments, embedded controller 126 may additionally or alternatively interface with the operating system or other process of IHS 100 in monitoring power demand events. In some embodiments, the operating system of IHS 100 may include operations that report power demand events, in some cases in a predictive manner. Using these capabilities, embedded controller 126 may detect forthcoming periods of elevated power demand by IHS 100. As described in additional detail with regard to the below embodiments, upon detecting a high-power event, embedded controller 126 may initiate a transition by power supply unit 115 and a coupled multimode USB-C power supply adapter, where the transition switches power delivery between a high-power supply mode and a USB-PD power supply mode. In some embodiments, embedded controller 126 may further interface with power operations supported by the IHS 100 (whether by the operating system of IHS 100, power supply unit 115 or by another process) in determining characteristics of the forthcoming high-power events. As described in additional detail with regard to FIG. 4, in some embodiments, the transition to a high-power supply mode may be delayed until additional validation of a high-power event is confirmed.

In management of operating modes of IHS 100, embedded controller 126 may implement operations for detecting certain changes to the physical configuration of IHS 100 and managing the modes corresponding to different physical configurations of IHS 100. For instance, where IHS 100 is a laptop computer or a convertible laptop computer, embedded controller 126 may receive inputs from a lid position sensor that may detect whether the two sides of the laptop have been latched together to a closed position. In response to lid position sensor detecting latching of the lid of IHS 100, embedded controller 126 may initiate operations for shutting down IHS 100 or placing IHS 100 in a low-power mode.

In this manner, IHS 100 may support the use of various power modes. In some embodiments, the power modes of IHS 100 may be implemented through operations of the embedded controller 126 and power supply unit 115. In various embodiments, a mobile IHS 100 may support various low power modes in order to reduce power consumption and/or conserve power stored in battery 124 when mobile IHS 100 is not actively in use. The power modes may include a fully on state in which all, or substantially all, available components of mobile IHS 100 may be fully powered and operational. In a fully off power mode, processor(s) 101 may powered off, any integrated storage devices 119 may be powered off, and/or integrated displays 108 may be powered off. In an intermediate low-power mode, various components of mobile IHS 100 may be powered down, but mobile IHS 100 remains ready for near-immediate use. In a standby power mode, which may be referred to as a sleep state or hibernation state, state information may be stored to storage devices 119 and all but a selected set of components and low-power functions of mobile IHS 100, such as standby functions supported by embedded controller 126, are shut down.

As described, IHS 100 may also include a power supply unit 115 that receives power inputs used for charging batteries 124 from which the IHS 100 operates. IHS 100 may include a power port 125 to which an AC adapter may be coupled to provide IHS 100 with a DC supply of power. The DC power input received at power port 125 may be utilized by a battery charger 120 for recharging one or more internal batteries 124 of IHS 100. As illustrated, batteries 124 utilized by IHS 100 may include one or more cells 124*a-n* that may connected in series or in parallel. Power supply unit 115 may support various modes for charging the cells 124*a-n* of battery system 124 based on the power supply available to IHS 100 and the charge levels of the battery system 124.

In certain embodiments, power supply unit 115 of IHS 100 may include a power port controller 114 that is operable for configuring operations by power port 125. In certain embodiments, power port controller 114 may be an embedded controller that is a motherboard component of IHS 100, a function supported by a power supply unit 115 embedded controller, or a function supported by a system-on-chip implemented by processors 101. In some embodiments, power port controller 114 may exchange communications, such as PSID (Power Supply Identifier) signals, with a multimode AC adapter coupled to power port 125 in identifying the adapter and negotiating its output. As described in additional detail regard to the below embodiments, in scenarios where a high-power supply is detected as being coupled to power port 125, power port controller 114 may receive inputs from embedded controller 126 directing the power supply input received at power port 125 to be routed to a high-power conversion circuit 128.

Using the high-power conversion circuit 128, the power supply unit 115 converts received supply inputs of up to 60 volts to a voltage (e.g., 18-20 volts) suitable for use in charging the internal battery system 124 of IHS 100, directly powering the operations of IHS 100 and/or providing power to external devices coupled to IHS 100. In scenarios where the supply voltage is being provided via a USB-C port 127*a-n*, USB-C power cords may be limited to transmitting 5 amps of current. In such instances, the high-power conversion circuit 128 may convert received 5-amp supply inputs of up to 60 volts to a power supply of approximately 18 volts/12 amps that is usable by IHS 100. In this manner, high power conversion circuit 128 may support use of USB-C couplings for transmission of power at voltages up to 60 volts and conversion of the supply voltage in a manner that supports power requirements above 200 watts, in some cases above 250 watts.

In some embodiments, high-power conversion circuit 128 may be implemented using a buck converter that includes a set of cascading digital voltage dividers (i.e., digital potentiometers) that may be driven at high frequencies (e.g., 10 MHz) in order to support high-efficiency voltage conversion. In some embodiments, the digital voltage dividers of the high-power conversion circuit 128 may be configured for being driven at high frequencies via the use of switching elements that utilize a GaAs semiconductor, as the inventors have recognized this configuration provides efficiency improvements over existing power supply techniques used to deliver power in the range of 60 volts. Existing buck converters that are utilized to support IHS power supplies operate using analog, capacitive voltage dividers. When converting a 54-volt input to an 18-volt output using such existing capacitive buck converters, conversion efficiencies are typically around 88%, thus generating up to 25 watts of heat. By utilizing digital voltage dividers driven at high frequencies, up to 98% conversion efficiencies may be obtained. Through such high efficiency conversion, heat dissipation remains manageable at approximately 5 watts. In some embodiments, high-power conversion circuit 128 may be a buck-boost converter, where the buck operations utilize digital voltage dividers and boost operations may be implemented using capacitive or inductive elements. As described in additional detail with regard to FIG. 2B, in embodiments where high-power conversion circuit 128 includes buck and boost capabilities, a multimode AC adapter according to embodiments may include the same high-power conversion circuit 128 that utilizes the converter's boost capabilities to efficiently generate outputs of up to 60 volts for transmission to IHS 100, where the circuit's buck capabilities are used to convert the supply to a voltage suitable for use by the IHS. By driving these digital voltage dividers at high frequencies, supply inputs of 50-60 volts may be efficiently converted to charging voltages of approximately 18-20 volts, thus supporting high-power operations of greater than 200 watts. When power demands are at more routine levels (e.g., less than 100 watts), however, the efficiency provided by high-frequency voltage dividers may be compromised. Accordingly, during intervals when power demands are at routine levels, the operation of the high-power conversion circuit may no longer provide efficiency benefits. Accordingly, as described in additional detail below, during intervals of routine power demand, embodiments may be configured to transition to USB-PD power outputs supported by a multimode AC adapter and during intervals of elevated power demand, embodiments may transition to high-power outputs supported by the multimode adapter.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2A:
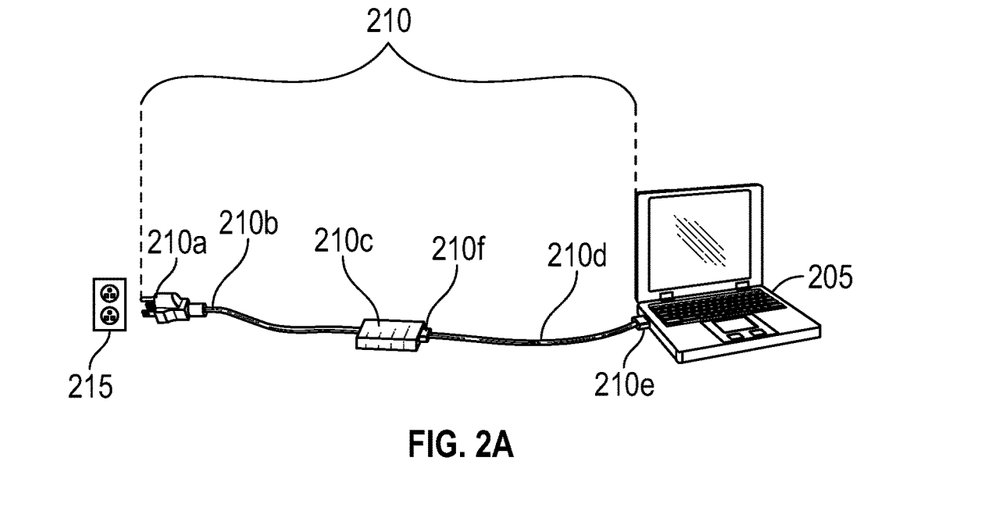
FIG. 2A is a diagram depicting certain components of an adaptive multimode USB-C power supply system, according to various embodiments, that includes an AC adapter that is coupled to an IHS that is a laptop computer.

FIG. 2A is a diagram depicting certain components of an adaptive multimode USB-C power supply system, according to various embodiments, where the system includes a multimode AC power adapter 210 coupled to an IHS that is a laptop computer 205. Multimode AC adapter 210 may be capable of providing supply voltages to laptop 205 that may include standard USB-PD output voltages, as well as high-power output voltages of up to 60 volts. Power provided by AC power adapter 210 may be used to charge the internal batteries of laptop computer 205 using power supplied via a power port or via a USB-C port of laptop 205. Via these supported power supply modes, multimode AC power adapter 210 may be used to charge the batteries of various types of portable IHSs, such as tablets, 2-1 laptops, convertible laptops, smartphones, smart watches, cameras, toys, gaming accessories, and various other types of devices. Embodiments may be implemented using all varieties of IHSs that operate on DC power supplied using rechargeable batteries and that charge these batteries using DC power converted by an AC adapter 210.

A multimode AC power adapter 210 according to embodiments may include several connected components that operate to draw AC power from an electrical outlet 215 and convert the AC power to a DC output for delivery to an IHS, such as the laptop 205 of FIG. 2. One end of the AC power adapter 210 includes an AC plug 210a that includes prongs that may be inserted into slots provided by an AC electrical outlet 215. Many different types of AC plugs 210a are utilized throughout the world, with different plugs from different regions utilizing different numbers, shapes and orientations of the prongs that conform to the electrical outlets used in a region. In North America, most general-purpose electrical outlets deliver 120 V of AC at a frequency of 60 hertz.

As illustrated, an AC electrical cord 210b of multimode AC adapter 210 connects AC plug 210a to multimode converter 210c. In many embodiments, AC electrical cord 210b may be removeable from converter 210c. Embodiments may also include AC electrical cords 210b that are fixed to converter 210c. A function of a multimode converter 210c is to convert the AC received from power cord 210b to a DC output that can be used to power IHSs that are compatible with the AC adapter 210. In certain instances, converter 210c may be referred to as a power brick. In some embodiments, multimode converter 210c may generate outputs in accordance with USB-PD protocols and may also generate high-power outputs that exceed the maximum 20 volts outputs of USB-PD, such as outputs up to 60 volts. In this manner, a multimode converter 210c may support multiple output supply modes, thus providing support for providing power to a range of IHSs, including IHSs such as high-power laptop computers. In some scenarios, the ability to efficiently support high-power supply modes allows high-power operations of the IHS 205 to be supported while still providing sufficient additional power to serve as a power source for devices coupled to IHS 205.

In some embodiments, the multimode AC power adapter may support a nominal high-power charging transmission of 54 volts, thus allowing for 10 percent fluctuations in the actual charging output while still maintaining outputs below 60 volts. Typical embodiments may support other nominal charging supply voltages between 50 volts and 60 volts depending on the anticipated fluctuations in the actual charging input. Many embodiments may support nominal supply voltages ranging from 54 volts to 56 volts. Some embodiments may be configured to support charging supply voltages significantly below 50 volts.

In supporting these multiple output supply modes, converter 210c may support identification of the multimode AC adapter 210 to the coupled IHS, where this identification information may be utilized in configuring the DC power output generated by converter 210c and transmitted to IHS 205. Converter 210c may also support capabilities for negotiating with IHS 205 to determine the parameters of the DC output supply voltage generated by converter 210c. The DC output generated by converter 210c is provided to laptop 205 via a DC power cord 210d that supplies the DC output via a connector that is received by a port of the laptop. As described with respect to the below embodiments, the output of multimode AC adapter 210 may be configured through negotiation with IHS 205 in adapting to varying power demands of IHS 205 such that multimode AC adapter 210 may be configured to provide USB-PD power outputs during certain periods of operation of IHS 205 and high-power outputs during other periods of operation.

DC cord 210d includes a DC plug 210f that may be received by a port of converter 210c. In the illustrated embodiment, the DC plug 210f is a USB-C connector that is received by a USB-C port of converter 210c. The DC plug 210e on the opposite end of DC cord 210d may be an identical to DC plug 210f and may thus also be a USB-C connector that is received by a USB-C port 205b of IHS 205.

In such embodiments, DC cord 210d may be a reversible USB-C cable with USB-C connectors on each end. In some embodiments, multimode AC adapter 210 may also support use of a DC cord 210d that, instead of USB-C connectors, includes a barrel connector for DC plug 210f that is received by a corresponding power port of converter 210c and also includes a barrel connector for DC plug 210e that is received by a power port 205a of IHS 205. In some embodiments, a DC cord 210d utilizing barrel connector DC plugs 210e and 210f may be reversible. In some embodiments, converter 210c may include both one or more USB-C ports and a barrel connector power port, thus supporting two types of removeable DC cords 210d. In some embodiments, converter 210c may support a single fixed DC cord 210d that may be a USB-C cord or a DC power code utilizing a barrel connector. As described, embodiments may support the transmission of power at voltages up to 60 volts, while adhering to the 5-amp limitation on some USB-C cords 210d. The high-power conversion circuit of IHS 205 may then be used to efficiently convert the transmitted power to a usable voltage in a manner that may provide over 200 watts of power to IHS 205. Through use of the high-power conversion circuit, high-power IHSs may be supported using thin USB-C cords 210d, thus promoting the use of thinner and more portable multimode AC adapters 210 for a large range of IHSs, including IHSs capable of utilizing more than 200 watts of power, and in some cases up to 250 watts of power. In addition, the efficient conversion provided by the high-power conversion circuit supports the use of thinner barrel connectors and thinner cabling for DC cords that are received by the power port of the IHS. As described, IHSs continue to get thinner and more portable. In some IHSs, the IHS power port that receives a cylindrical barrel connector is one of the thickest components of the IHS. By supporting thinner barrel connectors, the diameter of the power ports supported IHSs can also be reduced, thus providing an opportunity to make IHSs still thinner.

Figure 2B:
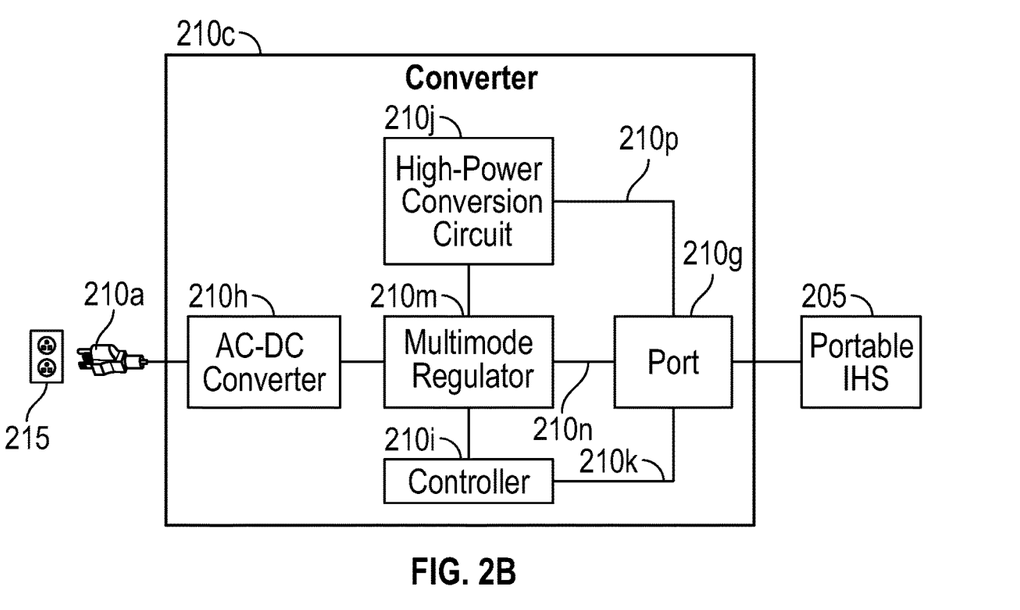
FIG. 2B is a diagram depicting certain additional components of an adaptive multimode power supply system, according to various embodiments, that includes an AC adapter that is coupled to an IHS.

FIG. 2B is a diagram depicting additional components of an adaptive multimode power system according to various embodiments, where the system includes a multimode converter 210c of AC power adapter coupled to an IHS 205. In FIG. 2B, certain of the internal components of a multimode converter 2101c, according to some embodiments, are illustrated. Multimode converter 210c receives AC power drawn from AC outlet 215 and provides portable IHS 205 with a supply of DC power. Multimode converter 210c may utilize an AC/DC converter 210h that receives the AC power and generates a supply of DC power that may be supplied to a multimode regulator 210m. Based on configurations provided by a controller 210i of the converter 210c, multimode regulator 210m may supply a regulated supply of DC power to a power port 210g of the converter or to a high-power conversion circuit 210j.

As described, in some embodiments, converter 210c may be coupled to mobile IHS 205 via a USB-C cable. Other embodiments may utilize a DC cable that couples to IHS 205 via a barrel connector coupling. The DC cabling, whether USB-C or a DC barrel connector cabling, may be received by a port 210g of the converter. The DC cable may be removable from port 210g, or may be fixed to port 210g. In some embodiments, converter 210c may include separate USB-C and DC barrel connector ports that may operate in the manner described for port 210g. Upon the AC converter being coupled to IHS 205, converter 210c and IHS 205 may initiate handshake procedures for identifying the capabilities of the AC adapter and in negotiating an output of converter 210c.

In USB-C embodiments, controller 210i of converter 210c and a USB controller of IHS 205, such as USB controller 111 of FIG. 1, may initiate USB-PD communications via a data pin of the USB-C coupling in determining the USB-PD outputs supported by converter 210c and in negotiating a USB-PD output (e.g., 5V, 9V, 15V, 20V) to be supplied to IHS 205 by converter 210c. Additionally, embodiments may supplement these USB-PD communications with additional communications conducted between controller 210i and the USB controller of IHS 205 via a data pin of the USB-C coupling. These additional communications may identify converter 210c as being a multimode converter capable of providing high-power outputs of up to 60 volts. The additional communications may also support negotiating a particular supply output by converter 210c, such as in response to the detection of a forthcoming high-power event or the end of a high-power event. In some embodiments, these additional communications for supporting high-power operations may be PSID signals that are transmitted along data pins of the USB-C coupling.

In embodiments that utilize a DC coupling with a barrel connector, a similar negotiation may be conducted between controller 210i of converter 210c and a power port controller of IHS 205, such as power port controller 114 of FIG. 1. In such embodiments, controller 210i and the power port controller of IHS 205 may exchange PSID messages via a data line included in the DC cabling. The exchanged PSID messages may identify converter 210c as a multimode converter capable of generating high-power outputs, as well as specifying ordinary power outputs that are supported by the converter. Additional PSID messages may be exchanged that negotiate a supply output by converter 210c, such as in response to the detection of a forthcoming high-power event or the end of a high-power event.

As indicated in FIG. 2B, controller 210i may utilize a data pathway 210k in receiving data line communications received by port 210g, whether the port is a USB-C port that transmits USB data pin communications or whether port 210g is a DC port relaying on PSID communications. Based on such data communications, controller 210i may specify the capabilities of converter 210c to IHS 205 and may negotiate the output to be supplied by converter 210c. Once the supply output of converter 210c has been negotiated, controller 210i may configure multimode regulator 210m for generating the negotiated output. In some instances, port 210g may be a USB-C power cord and controller 210i may negotiate a USB-PD output by converter 210c. In such instances, controller 210i may configure multimode regulator 210m to deliver a USB-PD output, via power pathway 210n, to port 210g. In other instances, controller 210i may negotiate a high-power output by converter 210c. In such instances, controller 210i may configure multimode regulator 210m to route its output to high-power conversion circuit 210j for generating a high-power output of a voltage up to 60 volts and delivering greater than 200 watts of power.

As described with regard to FIG. 1, a high-power conversion circuit 128 may be utilized by an IHS 100 to efficiently convert high-power supply inputs of up to 60 volts to a voltage (e.g., 18-20 volts) suitable of use by IHS 100. In some embodiments, the high-power conversion circuit 128 of IHS 100 may be a buck-boost converter that may include capacitive and/or inductive boost capabilities. In some embodiments, the boost capabilities of this same buck-boost, high-power conversion circuit 210j may be utilized by multimode AC converter 210c in efficiently generating high-power supply outputs. In such embodiments, the same conversion circuit may be utilized by both the power supply unit of IHS 205 and the AC converter 210*c*. In some embodiments, boost capabilities of a high-power conversion circuit 210*j* may be implemented using capacitive elements, such as switched capacitors that may be driven at high frequencies in order to provide high-efficiency conversions with as little as 2% loss. Such capacitive conversion elements provide efficient conversions but are capable of supporting only a limited number of conversion ratios, thus limiting the use of capacitive elements to use in converting a certain set of input and output voltages. Some embodiments may additionally or alternatively implement boost capabilities using inductive elements, thus operating at reduced efficiencies, but providing the ability to support a wider range or conversions. In some embodiments, the high-power conversion circuit 210*j* included in multimode AC converter 210*c* may include only boost converter capabilities, and may thus provide complimentary capabilities to a buck converter or buck-boost high-power conversion circuit 128 in the coupled IHS 205.

Figure 3:
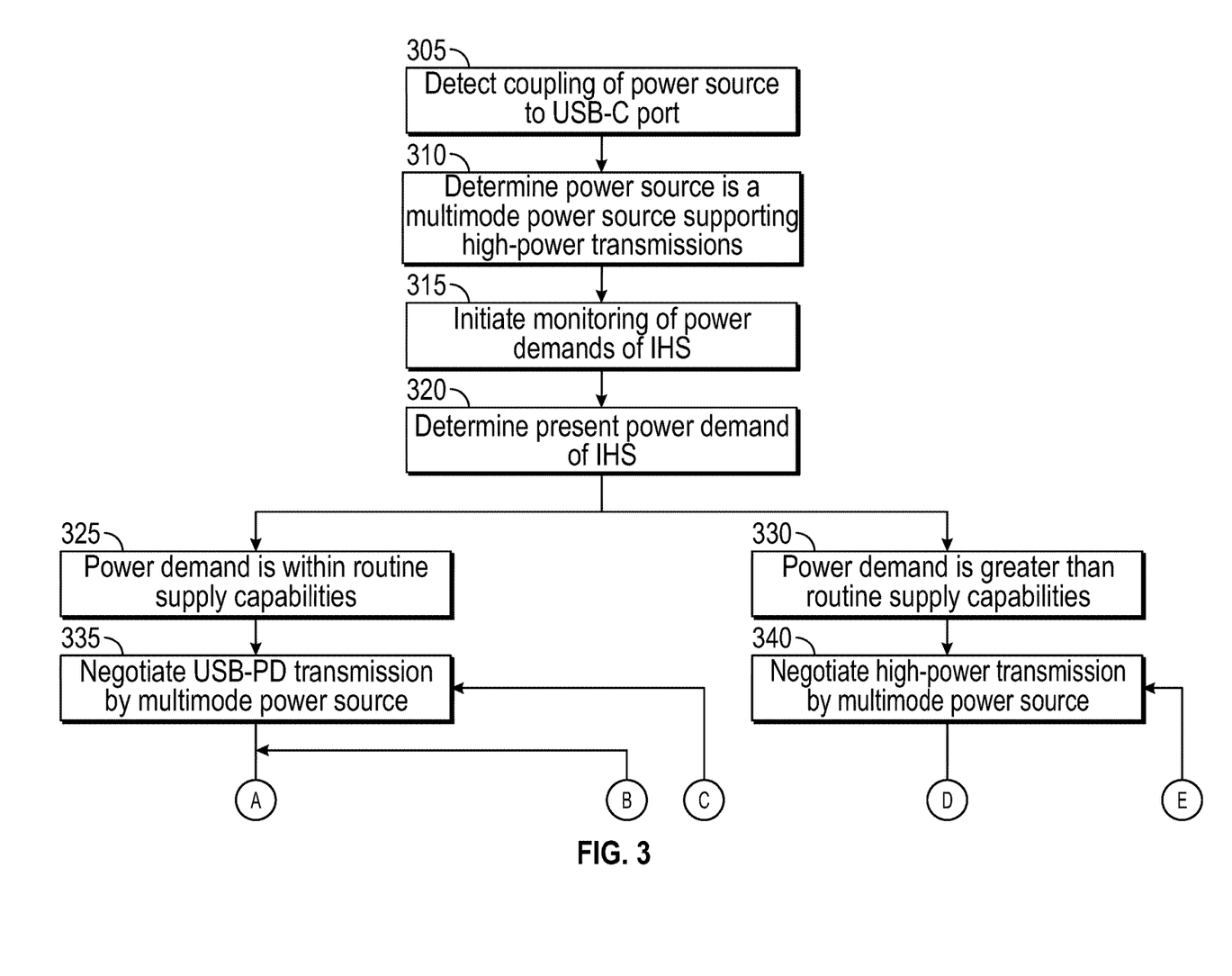
FIG. 3 is a flow chart diagram illustrating certain steps of a process according to various embodiments for adaptive multimode transmission and conversion of power delivery to an IHS.

FIG. 3 is a flow chart illustrating steps of a process according to various embodiments for adaptive multimode transmission and conversion of power supplied to an IHS. In some scenarios, embodiments may begin at block 305 with the coupling of a power source to a USB-C port of an IHS. As described with regard to FIG. 1, an IHS according to embodiments may include a USB controller that detects the coupling of a device to one or more USB-C ports supported by the IHS. For instance, upon coupling a USB-C connector of an multimode adapter, such as multimode AC adapter 210 described with regard to FIGS. 2A and 2B, to a USB-C port of an IHS, a USB controller of the IHS may detect a voltage on one or more power pins of the USB-C port.

In response to detecting a coupling of a power source to a USB-C port, at block 310, an IHS according to embodiments may determine whether the power source is a multimode USB-C adapter that supports high-power supply transmissions, such as described herein. In certain embodiments, the converter portion of a multimode USB-C adapter, such as multimode converter 210*c* of FIG. 2, may include circuitry and/or logic that detects a voltage being drawn by an IHS via the DC power cord of the adapter. In such embodiments, upon detecting a voltage drawn by the IHS, the USB-C adapter may be configured to generate multimode converter messages, that may include USB-PD messages and PSID signals, that may be transmitted via a data channel supported by the USB-C adapter. The USB controller of the IHS may detect the transmission of such multimode converter messages by the USB-C adapter. The multimode converter messages may be detected and processed by the USB controller and may be forwarded to an embedded controller, such as embedded controller 126 of the IHS of FIG. 1, that supports certain power mode configurations of the IHS. Based on the received multimode converter messages, the embedded controller may determine characteristics of the USB-C adapter, such as whether it supports high-power supply transmissions, as well as the USB-PD modes that are supported.

As described, an IHS according to embodiments may include an embedded controller that is configured to interface with the power supply unit, the operation system and/or other processes of the IHS in determining power demands of the IHS. At block 315, such monitoring of the power demands of the IHS may be initiated. In some embodiments, power demand monitoring may track the ongoing demand for power by the IHS. For instance, a power supply unit of the IHS may report a measurement of the power that is being drawn from the IHS batteries in order to power ongoing operations of the IHS and/or serve as a power source to external devices coupled to the IHS. In various embodiments, such ongoing power demand measurements may be provided directly by the battery system or by other components of the IHS.

In some embodiments, determining power demands of an IHS may include monitoring for IHS operations that are associated with elevated power demands. In such embodiments, the embedded controller may be configured to interface with the operating system of the IHS in order to detect events that are associated with elevated power levels. For instance, the embedded controller may interface with the operating system in order to detect the initialization of user applications, system applications or other operating system processes that have been identified as being associated with elevated demands for power. In some embodiments, the embedded controller may monitor the operations of various other components of the IHS in monitoring the power demands of the IHS. For instance, the embedded controller may monitor the status of integrated storage drives of the IHS. Upon detecting a transition by a storage drive from a standby state to an active state, the embedded controller may signal an indication of a forthcoming power demand event. In this manner, the embedded controller may signal power demand events upon detecting state transitions in other integrated and external components of the IHS, such as integrated displays, graphics processors, storage and memory systems, coupled I/O devices and network interfaces. In some embodiments, additionally procedures may be initiated for monitoring additional aspects of the IHS operation, such as thermal and acoustic measurements, that may be used in transitioning a multimode power supply system between operating modes. At block 315, all such monitoring for power demand events and monitoring of ongoing power demand may be initiated.

At block 320, the present power demands of the IHS may be determined for use in configuring the power output to be provided by the coupled multimode AC adapter. In certain scenarios, the present power demands may be below a threshold that can be efficiently supported using routine power transmission and conversion capabilities. As described, USB-PD protocols are limited to transmitting no more than 100 watts of power. Accordingly, at block 325, the present power demand of the IHS may be determined to be within routine power supply capabilities (e.g., 100 watts or less) and, at block 335, an appropriate USB-PD transmission by the coupled multimode AC adapter may be negotiated. As described with regard to FIG. 1, an IHS according to embodiments may include an embedded controller that is configured to manage certain power operations of IHS. In such embodiments, an embedded controller may negotiate with the multimode AC adapter for a USB-PD transmission that is suitable for the power demands of the IHS during periods of routine power consumption. In many scenarios, the power demands of an IHS might be characterized by prolonged periods of routine power demand interspersed with intervals of elevated power demands. During these periods of routine power demand, the power supply demands may be satisfied USB-PD transmission capabilities of a coupled multimode AC adapter. As described, use of high-power transmission capabilities during periods of routine power demand may result in diminished efficiency in the operation of the high-power conversion circuit such that overall efficiency is improved by reverting to USB-PD transmissions during periods of routine power demand. In some embodiments, the use of routine transmission capabilities may be selected based on additional or alternative factors, such as thermal measurements indicating insufficient cooling capacity to support additional heat resulting from high-power conversion operations and also such as acoustic measurements indicating noise levels that are near or above acceptable noise level thresholds for the operation of the IHS.

In other scenarios, the measured power demands of the IHS may be greater than routine power supply capabilities, such as the power outputs supported by USB-PD. Accordingly, at block 330, measured power demands greater than routine supply capabilities (e.g., 100 watts) may be detected by the embedded controller of the IHS. In order to meet the elevated power demands, at block 340, a high-power transmission by the multimode AC adapter may be negotiated and the power supply unit of the IHS is configured for use of the high-power conversion circuit. As described, a multimode AC adapter according to embodiments may be configured to deliver up to 60 volts of charge to an IHS via a USB-C coupling. As described with regard to FIG. 1, upon negotiating a high-power transmission by a multimode AC adapter, the embedded controller may route the high-power transmission to a high-power conversion circuit of the IHS power supply unit. The high-power conversion circuit may utilize a set of digital voltage dividers in efficiently converting the delivered high-power voltage to a lower voltage suitable for use in charging the battery system, supporting high-power operations of the IHS, and/or providing power to external devices coupled to the IHS.

As described with regard to the high-power conversion circuit of FIG. 1, existing conversion circuits typically utilize analog voltage dividers in converting received supply voltages to a voltage for use by the battery charging system. Embodiments may utilize a set of digital voltage dividers that generate significantly less heat than analog voltage dividers in performing such conversions. For instance, the embedded controller may negotiate a 54-volt transmission by a multimode AC adapter, which may be converted to an 18-volt output using two digital voltage dividers of the high-power conversion circuit. Implementing this particular conversion using existing analog voltage dividers may require three or more analog voltage dividing circuits, thus resulting in conversion efficiencies of approximately 88 percent. Such levels of inefficiency not only result in wasted power, but also may generate up to 25 watts of heat within the IHS conversion circuit. Digital voltage divider conversion according to embodiments may result in efficiencies approaching 98 percent, thus resulting in a loss of approximately 5 watts. In some embodiments, the embedded controller may negotiate a lower supply voltage, such as 36 volts, with the multimode AC adapter, thus requiring use of only a single digital voltage divider by the high-power conversion circuit to reach an 18-volt output, while generating even less heat.

Using the output of the high-power conversion circuit, the high-power output of the multimode AC adapter ma be used to support periods of high-power operations by an IHS, while still providing sufficient power to support battery charging operations and/or providing power to external devices coupled to the IHS. As described, the high-power conversion circuit may efficiently convert a 54-volt power supply to a supply voltage of approximately 18 volts. In this manner, the high-power charging transmission of a multimode AC adapter may be used to generate over 200 watts of power that supports periods of high-power operations by an IHS. However, as described, due to the digital voltage dividers of the high-power conversion circuit being driven at high frequencies, the efficiency of the voltage dividers is reduced for lower voltages, such as voltages drawn by the IHS during periods of routine power demand.

As described, various operations for monitoring the power demand of an IHS may be utilized for detecting indications that the IHS's power demands have transitioned above or below a power threshold that can be supplied via USB-PD power outputs, as well as detecting indications that a power demand event has been initiated that will result in elevated power demands that exceed this power threshold. While operating in a high-power transmission mode, at block 350, these monitoring operations may detect transitions from a high-power demand to below the threshold that can be supplied by routine power delivery operations. Accordingly, at block 335, the IHS negotiates a USB-PD output by the multimode AC adapter and the power supply system reverts to routine power delivery operations in which the high-power conversion circuit is disengaged. In some embodiments, such transitions from high-power outputs to routine outputs may alternatively or additionally be indicated by thermal and/or acoustic characteristics. For instance, temperature measurements may indicate that cooling is insufficient to continue further supply and conversion of a high-power input. Similarly, noise measurements may indicate that cooling operations required to support high-power operations are resulting in noise levels about an acoustic threshold.

In scenarios where routine power delivery operations are being conducted, at block 355, a forthcoming power demand event may be detected. As described, an IHS according to embodiments may implement operations by which an embedded controller detects or receives notifications of forthcoming power demand events. The embedded controller may identify power demand events based on information provided by various components of an IHS, such as based on information provided via the operating system of the IHS, based on information collected directly from hardware components of an IHS and information generated through operation of the embedded controller. For instance, in some embodiments, the embedded controller may utilize an operating system process that detects and reports certain operations that are associated with an elevated power demand. In one example, an operating system may detect certain user operations associated with elevated power demands, such as a user launching a new application or initiating a high-power operation within use of an application (e.g., initiating editing of an image). In another example, power demand events may be identified through direct monitoring of certain components of the IHS by the embedded controller. For example, embedded controller may detect a change in state (e.g., from a low-power state to a full-power state) by a graphics processor or by a storage drive of an IHS or detecting an external device being coupled to the IHS as a power source, thus indicating forthcoming activity and increased power consumption by these components. In some instances, the embedded controller may itself identify high-power events, such as the initiation of hibernation or other state preservation procedures upon transitioning of the IHS to a standby power mode.

As indicated in FIG. 3, upon detecting a power demand event, the embedded controller may preemptively initiate configuration of the power supply unit to utilize the high-power conversion circuit. As described in additional detail with regard to FIG. 4, by preemptively configuring use of the high-power conversion circuit, delays and power starvation may be avoided that may otherwise result in waiting to configure use of the high-power circuit until a high-power condition is detected. In some embodiments, this preemptive configuration may include configuring use of the high-power conversion circuit and may also include configuring aspects of the high-power conversion, such as selecting the number of digital voltage dividers of the conversion circuit to be engaged. Once configuration of the high-power conversion circuit has been initiated, the power configurations may continue, at block 340, with the negotiation of a high-power output by the multimode AC adapter.

In additional scenarios where routine power delivery operations are being conducted, at block 345, a transition may be detected in the power demand of the IHS above the power delivery threshold that may be provided using routine power delivery operations (e.g., 100 watts). In some instances, such transitions may be associated with sustained power demands above this threshold. However, as described with regard to FIG. 4, in some instances, such transitions may be brief in duration. Accordingly, in such scenarios, switching to use of the high-power supply mode may not be warranted since the power demand may have dropped below the threshold for high-power operations by the time the high-power conversion circuit has been engaged and the multimode adapter is ready to begin delivery of high-power outputs. In some embodiments, at block 360, the embedded controller may evaluate whether to initiate a transition to a high-power mode, or delay the transition until additional confirmation of the high-power condition can be identified.

In some embodiments, transition to high-power operations may be delayed, at block 360, in order to determine whether to delay the transition to high-power operations until the high-power demand can be further confirmed. In some instances, power demands may rise significantly above the threshold (e.g., power demands of 125% of the threshold) such that an immediate transition to high-power operations is warranted. In other instances, power demands may fall below this second threshold such that, at block 370, the power demand may be further confirmed before transitioning to high-power delivery modes. In confirming the need to switch to high-power delivery, embedded controller may be configured to continue monitoring power demand measurements. If power demands remain above the threshold for a specified duration or if power demands continue increasing, a transition to high-power delivery may be triggered and configuration of the high-power conversion circuit may be initiated at block 365. However, in some scenarios, power demands may instead decrease back below the threshold, thus obviating the need to transition to a high-power mode. In such scenarios, routine power delivery may continue.

Figure 4:
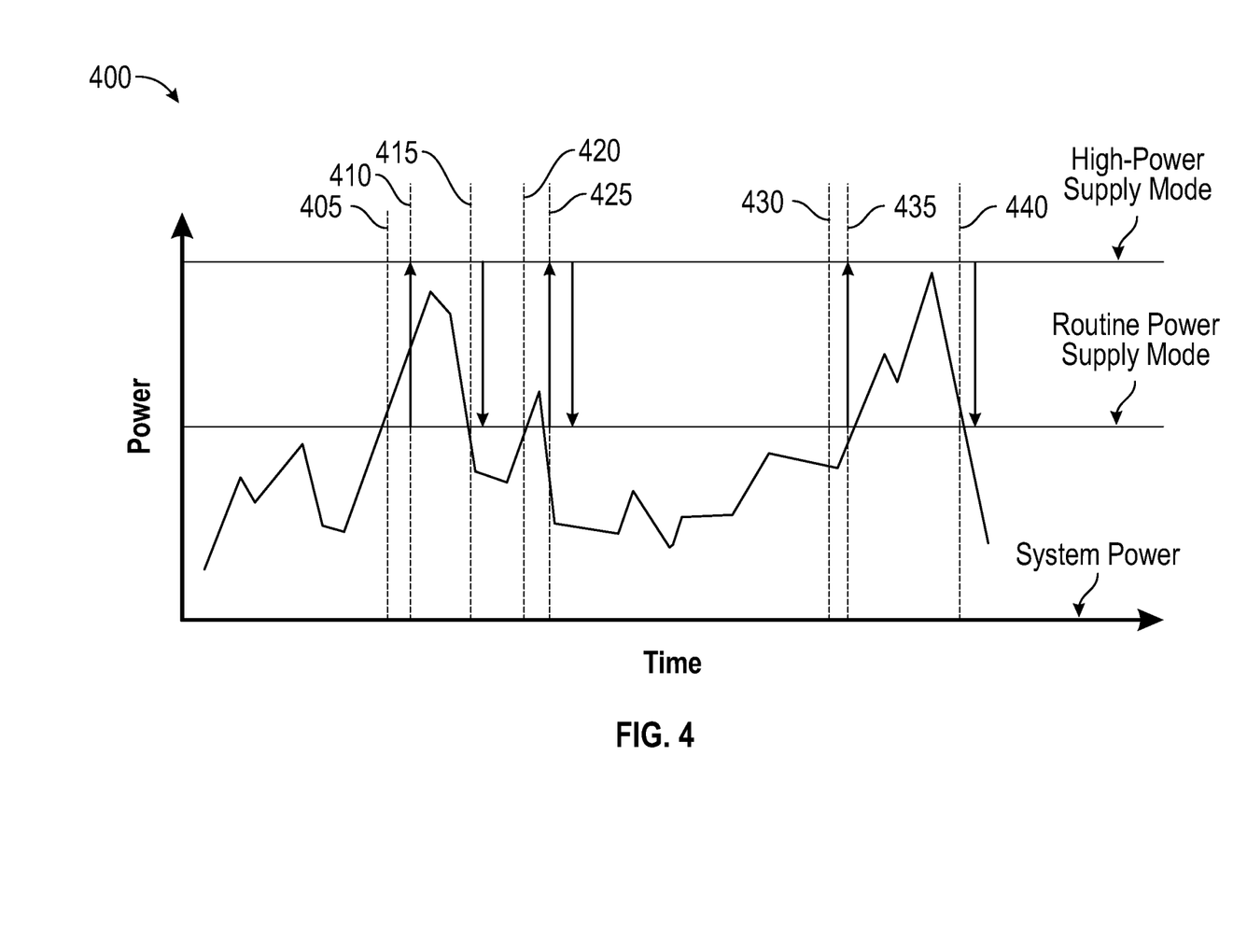
FIG. 4 is a graph diagram illustrating certain aspects of the operation of a system configured according to various embodiments for providing adaptive multimode USB-C power transmission and conversion.

FIG. 4 is a graph diagram illustrating certain aspects of the operation of a system configured according to various embodiments for providing adaptive multimode USB-C power transmission and conversion. The diagram of FIG. 4 plots a curve 400 that illustrates measurements of the power demands of an IHS over time. During the initial power demand interval prior to time 405, the power demand of the IHS varies, but remains below a power threshold corresponding to an upper limit of routine power demands of the IHS. In some embodiments, the power threshold for routine power demands corresponds to the 100-watt power output capabilities of USB-PD. As illustrated, at time 405, the power demand of IHS surpasses the power threshold corresponding to the upper limit on routine power demand. As described, in response to detecting the transition from routine power demand to an elevated power demand, the multimode power adapter is configured to supply a high-power transmission and configures the power supply unit of the IHS for use of the high-power conversion circuit. At 410, the multimode AC adapter begins supply of a high-power transmission, thus providing the power necessary to meet the elevated power demands of the IHS.

As illustrated, due to the delay incurred in detecting a transition in power demands above the power threshold, at time 405, and in configuring the multimode AC adapter and the power supply unit, high-power transmissions are not available until time 410. During this interval of insufficient power delivery, an IHS may be configured to supplement operating power by drawing from the battery. If battery power is not available, the capabilities of an IHS may be degraded or otherwise limited until the high-power transmission is available for use at time 410. In reducing the periods during which the IHS operates using insufficient power, some embodiments may support preemptive configuration of the high-power conversion circuit based on the detection of certain power demand events. At time 430, the embedded controller may detect a forthcoming high-power event. For instance, embedded controller may detect the transition of an external hard drive coupled to an IHS transitioning from a standby state to an operational state, thus indicating an increase in the power demands of the IHS above routine power demand levels. In another scenario, the embedded controller may detect the initialization of a xR software application or gaming application, thus indicating a period of elevated power demands. In another scenario, the embedded controller may receive notification from the operating system of a high-power operation being initiated by an application, such as initiating an editing mode in a 3-D graphics application. In another scenario, the embedded controller may detect the coupling of an external device to the IHS, where this device may draw power from the IHS. As described, in some instances, power supply capabilities may be preemptively configured to supply high-power transmissions.

With the power demand event detected at time 430, the high-power conversion circuit is configured for use at the request of the embedded controller. The embedded controller also configures the multimode AC adapter for high-power transmissions. At time 435, the high-power transmission becomes available. Soon after, the power demand surpasses the power threshold of routine power demands. With the power supply already increased, the high-power operations may proceed while being fully powered. At time 440, power demands return back to routine levels and the multimode AC adapter is configured to return to routine power output levels.

As illustrated in FIG. 4, in some instances, increases in power demands above routine levels may be significant and may extend for significant intervals. In some other instances, however, the elevated power demand levels may only briefly surpass the power threshold of routine operations. If the adaptive power scheme implemented by the embedded controller were to initiate a transition to high-power outputs by a multimode AC adapter at every instance of a power demand exceeding the threshold of routine operations, some configuration of the multimode AC adapter would be extraneous. For instance, upon detecting power demands above the threshold of routine operations at time 420, a high-power output is configured and is available at time 425. However, the power demand of the IHS actually returns to routine power demand levels at time 425, thus resulting in a transition back to routine power outputs. In such circumstances, the configuration of the multimode AC adapter and the power supply unit for high-power operations is unnecessary. Accordingly, in some embodiments, power demands above the threshold operations may be confirmed prior to transitioning to high-power operations, where such confirmations may be based on a power levels above the threshold for a specified duration and/or must be measured at certain amount above the threshold. In this manner, certain unnecessary power output transitions may be avoided.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for powering an Information Handling System (IHS) using a multimode AC (Alternating Current) adapter, the method comprising:

determining, based on information reported by the multimode AC adapter, the multimode AC adapter supports USB-PD (Universal Serial Bus Power Delivery) power transmissions and further supports high-power transmissions of a voltage greater than the voltages of the USB-PD power transmissions;

detecting IHS events indicating a period of elevated power demand by the IHS, wherein the elevated power demand comprises a power demand greater than power levels of the supported USB-PD power transmissions;

determining whether a detected IHS event results in a power demand greater than power levels of the supported USB-PD power transmissions;

when the power demand of the detected IHS event is greater than the power levels of the supported USB-PD power transmissions, determining whether the power demand of the detected IHS event exceeds a threshold power demand indicating a need for an immediate transition to high-power transmissions;

when the power demand of the detected IHS event is greater than the power levels of the supported USB-PD power transmissions and does not exceed the threshold power demand, monitoring for additional IHS events confirming the period of elevated power demand by the IHS and configuring the multimode AC adapter for providing a USB-PD transmission until additional IHS events are identified that confirm the period of elevated power demand;

when the power demand of the detected IHS event is greater than the power levels of the supported USB-PD power transmissions and exceeds the threshold power demand, confirming the period of elevated power demand, configuring the multimode AC adapter to generate a high-power transmission, and further configure a power circuit of the IHS for converting the high-power transmission to a voltage used to power operations of the IHS; and when the power demand of the detected IHS event is not greater than the power levels of the supported USB-PD power transmissions, configure the multimode AC adapter for providing a USB-PD transmission.

2. The method of claim 1, wherein the high-power transmission generated when the power demand of the detected IHS event exceeds the threshold power demand comprises a nominal voltage of approximately 54 volts and a peak voltage not exceeding 60 volts.

3. The method of claim 1, wherein the operation of the power circuit that is configured for use when the power demand of the detected IHS event exceeds the threshold power demand generates greater than 200 watts of power in converting the high-power transmission to the voltage used to power operations of the IHS.

4. The method of claim 1, wherein the power circuit comprises a plurality of digital voltage dividers operable for converting the high-power transmission to the voltage used to power operations of the IHS.

5. The method of claim 1, wherein the configuration of the power circuit comprises selection of one or more of the plurality of digital voltage dividers for converting the high-power transmission to the voltage used to power operations of the IHS.

6. The method of claim 1, further comprising:

delaying the configuration of the power circuit until the additional IHS events are detected that confirm the period of elevated power demand by the IHS.

7. The method of claim 1, wherein the IHS events indicating a period of elevated power demand by the IHS comprises a request for the IHS to provide power to an external device coupled to the IHS.

8. The method of claim 1, wherein the IHS events indicating a period of elevated power demand by the IHS comprises a state change of an integrated component of the IHS.

9. The method of claim 1, wherein the IHS events indicating a period of elevated power demand by the IHS comprises an initialization of a software application.

10. A system for powering an Information Handling System (IHS), the system comprising:
 a multimode AC (Alternating Current) adapter configured to support power transmissions comprising USB-PD (Universal Serial Bus Power Delivery) transmissions and further comprising high-power transmissions of a voltage greater than voltages of the USB-PD transmissions; and
 the IHS configured to:
  detect IHS events indicating a period of elevated power demand by the IHS, wherein the elevated power demand comprises a power demand greater than power levels of the supported USB-PD power transmissions;
  determine whether a detected IHS event results in a power demand greater than power levels of the supported USB-PD power transmissions;
  when the power demand of the detected IHS event is greater than the power levels of the supported USB-PD power transmissions, determine whether the power demand of the detected IHS event exceeds a threshold power demand indicating a need for an immediate transition to high-power transmissions;
  when the power demand of the detected IHS event is greater than the power levels of the supported USB-PD power transmissions and does not exceed the threshold power demand, monitoring for additional IHS events confirming the period of elevated power demand by the IHS and configuring the multimode AC adapter for providing a USB-PD transmission until additional IHS events are identified that confirm the period of elevated power demand;
  when the power demand of the detected IHS event is greater than the power levels of the supported USB-PD power transmissions and exceeds the threshold power demand, confirming the period of elevated power demand, configure the multimode AC adapter to generate a high-power transmission, and further configure a power circuit of the IHS for converting the high-power transmission to a voltage used to power operations of the IHS; and
  when the power demand of the detected IHS event is not greater than the power levels of the supported USB-PD power transmissions, configure the multimode AC adapter for providing a USB-PD transmission.

11. The system of claim 10, wherein the high-power transmission generated when the power demand of the detected IHS event exceeds the threshold power demand comprises a nominal voltage of approximately 54 volts and a peak voltage not exceeding 60 volts.

12. The system of claim 10, wherein the operation of the power circuit that is configured for use when the power demand of the detected IHS event exceeds the threshold power demand generates greater than 200 watts of power in converting the high-power transmission to the voltage used to power operations of the IHS.

13. The system of claim 10, wherein the IHS events indicating a period of elevated power demand by the IHS comprises a request for the IHS to provide power to an external device coupled to the IHS.

14. The system of claim 10, wherein the IHS is further configured to:
 delay the configuration of the power circuit until the additional IHS events are detected that confirm the period of elevated power demand by the IHS.

15. The system of claim 10, wherein the power circuit comprises a plurality of digital voltage dividers operable for converting the high-power transmission to the voltage used to power operations of the IHS.

16. An Information Handling System (IHS) provided power using a multimode AC (Alternating Current) adapter, the IHS comprising:
 one or more processors;
 a memory device coupled to the one or more processors, the memory device storing computer-readable instructions that, upon execution by the one or more processors, cause execution of an operating system of the IHS; and
 an embedded controller comprising a memory having program instructions stored thereon that, upon execution by a logic unit of the embedded controller, cause the embedded controller to:
  determine the multimode AC adapter supports USB-PD (Universal Serial Bus Power Delivery) charging transmission and further supports high-power transmissions of a voltage greater than voltages of the USB-PD transmissions supported by the multimode AC adapter;
  detect IHS events indicating a period of elevated power demand by the IHS, wherein the elevated power demand comprises a power demand greater than power levels of the supported USB-PD power transmissions;
  when the power demand of the detected IHS event is greater than the power levels of the supported USB-PD power transmissions, determine whether the power demand of the detected IHS event exceeds a threshold power demand indicating a need for an immediate transition to high-power transmissions;
  when the power demand of the detected IHS event is greater than the power levels of the supported USB-PD power transmissions and does not exceed the threshold power demand, monitoring for additional IHS events confirming the period of elevated power demand by the IHS and configuring the multimode AC adapter for providing a USB-PD transmission until additional IHS events are identified that confirm the period of elevated power demand;
  when the power demand of the detected IHS event is greater than the power levels of the supported USB-PD power transmissions and exceeds the threshold power demand , confirming the period of elevated power demand, configure the multimode AC adapter to generate a high-power transmission, and further configure a power circuit of the IHS for converting the high-power transmission to a voltage used to power operations of the IHS; and
  when the power demand of the detected IHS event is not greater than the power levels of the supported USB-PD power transmissions, configure the multimode AC adapter for providing a USB-PD transmission.

17. The IHS of claim 16, wherein the high-power charging transmission generated when the power demand of the detected IHS event exceeds the threshold power demand comprises a nominal voltage of approximately 54 volts and a peak voltage not exceeding 60 volts.

18. The IHS of claim 16, wherein the power circuit comprises a plurality of digital voltage dividers operable for converting the high-power transmission to the voltage used to power operations of the IHS.

19. The IHS of claim 18, wherein the configuration of the power circuit comprises selection of one or more of the plurality of digital voltage dividers for converting the high-power transmission to the voltage used to power operations of the IHS.

20. The IHS of claim 16, wherein execution of the program instructions further causes the embedded controller to:

delay the configuration of the power circuit until the additional IHS events are detected that confirm the period of elevated power demand by the IHS.

* * * * *